(12) United States Patent
Yoyasu

(10) Patent No.: US 7,165,371 B2
(45) Date of Patent: Jan. 23, 2007

(54) AUTOMOBILE MOLDING AND FASTENER THEREFOR

(75) Inventor: Masae Yoyasu, Yokohama (JP)

(73) Assignee: Altia Hashimoto Co., Ltd., Kanagawa-ken (JP)

( * ) Notice: Subject to any disclaimer, the term of this patent is extended or adjusted under 35 U.S.C. 154(b) by 19 days.

(21) Appl. No.: 09/975,284

(22) Filed: Oct. 10, 2001

(65) Prior Publication Data

US 2002/0043041 A1 Apr. 18, 2002

(30) Foreign Application Priority Data

Oct. 13, 2000 (JP) .................................... P2000-314316

(51) Int. Cl.
*E04C 2/38* (2006.01)

(52) U.S. Cl. ..................... 52/716.5; 52/716.6; 52/716.7; 52/716.8; 24/292; 24/293; 24/297; 428/31

(58) Field of Classification Search ................ 52/716.5, 52/716.6, 716.7; 24/292, 297, 293, 289; 428/31
See application file for complete search history.

(56) References Cited

U.S. PATENT DOCUMENTS

| | | | | |
|---|---|---|---|---|
| 2,521,271 A | * | 9/1950 | Wiley ......................... | 52/716.5 |
| 3,246,375 A | * | 4/1966 | Landwer ..................... | 24/297 |
| 4,172,000 A | * | 10/1979 | Horike et al. ............... | 156/108 |
| 4,363,839 A | * | 12/1982 | Watanabe et al. ............ | 428/31 |
| 4,630,338 A | * | 12/1986 | Osterland et al. ............ | 24/293 |
| 4,758,020 A | | 7/1988 | Boyd | |
| 5,195,793 A | * | 3/1993 | Maki ........................... | 293/155 |
| 5,275,455 A | * | 1/1994 | Harney et al. .............. | 296/1.08 |
| 5,639,522 A | | 6/1997 | Maki et al. | |
| 5,876,084 A | * | 3/1999 | Smith et al. ................ | 296/39.1 |
| 6,276,109 B1 | * | 8/2001 | Hingorani et al. ......... | 52/716.5 |
| 6,405,494 B1 | * | 6/2002 | Wismeth ..................... | 52/173.3 |
| 6,594,870 B1 | * | 7/2003 | Lambrecht et al. ........... | 24/297 |

FOREIGN PATENT DOCUMENTS

| | | |
|---|---|---|
| DE | 19905547 | 8/2000 |
| JP | 53-70119 | 6/1978 |
| JP | 63-198814 | 12/1988 |
| JP | 03-23213 | 3/1991 |
| JP | 09-042237 | 2/1997 |
| JP | 09226476 | 9/1997 |
| JP | 11247810 | 9/1999 |

\* cited by examiner

*Primary Examiner*—Jeannette E. Chapman
(74) *Attorney, Agent, or Firm*—Kolisch Hartwell, P.C.

(57) ABSTRACT

The present invention addresses the demand for a technology that enables reutilization of a molding main body and the fasteners for fixing a molding main body to an automobile following the removal of these parts from one another. The present invention proposes a car molding and fastener, in which a base plate is provided to a fastener for fixing molding main body to a car body, base plate being inserted into and held in place in housing space of a fastener holder that is formed to molding main body. Elastic pieces are provided on opposite sides of base plate, and have protruding portions which engage in a releasable manner with engage-and-stop portions on either side of fastener holder. By manipulating these elastic pieces, the aforementioned engagement is released, so that fastener can be separated from fastener holder in this car molding.

28 Claims, 11 Drawing Sheets

FIG. 6A
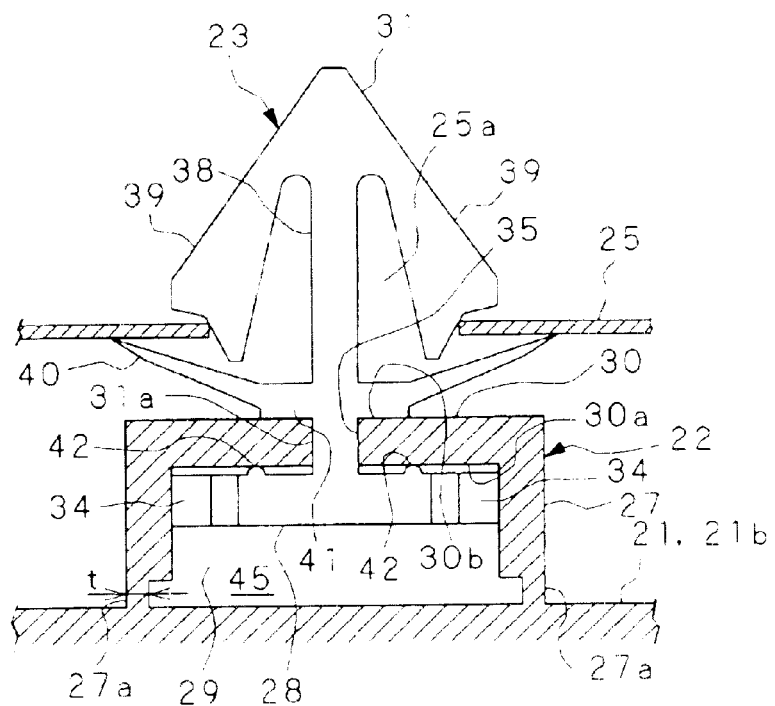
FIG. 6B
FIG. 6C
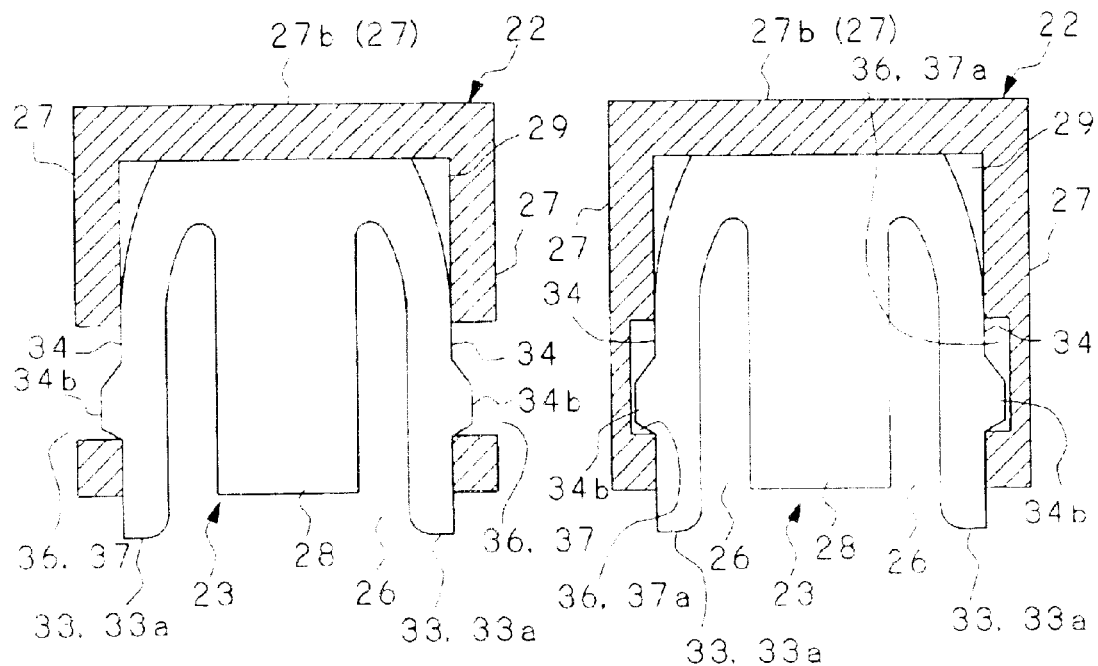

AUTOMOBILE MOLDING AND FASTENER THEREFOR

BACKGROUND OF THE INVENTION

1. Field of the Invention

The present invention relates to an automobile molding and to a fastener for attaching this molding to a car body.

2. Description of the Related Art

So-called "fastener-held automobile molding," such as employed in body-side, roof or bumper molding, has been proposed, for example, in Japanese Patent Application No. Hei 9-226476 (see FIGS. 12 and 13). When attaching this type of molding to a car body, a fastener 8, which has engaging claws 7 that project from its tip for engaging into a mounting hole in the car body, is engaged and clipped into a fastener holder 6. Fastener holder 6 is formed of three projecting walls 4, which project out from the molding main body 1 surface that is opposite the design face which will be on the outside of the car (i.e., projecting walls 4 are provided to the surface of the molding that will face the car, hereinafter referred to as "reverse face 2"), projecting walls 4 forming three sides that run along the directions in which reverse face 2 extends, excluding opening 3 which is left open on one side of reverse face 2; and a plate-shaped fastener mounting seat 5 which is formed connecting the ends of projecting walls 4 that are projecting out from molding main body 1. In this design, the molding is attached to the car body by engaging the engaging claws 7 at the end of fastener 8 with the mounting hole in the car body. Namely, base plate 9, which is provided at the base end of fastener 8 opposite engaging claws 7, is inserted via opening 3 into the internal housing space 10 that is enclosed by the three projecting walls 4 and fastener mounting seat 5 in fastener holder 6, and is housed therein. A pair of holding claws 11, which are formed to both sides of base 9 at its trailing end of insertion into housing space 10 and project in the direction of insertion of base plate 9, engage from the outside with stopping members 12 which are formed in the two projecting walls 4 that are on either side of opening 3. As a result, fastener 8 is prevented from falling out of fastener holder 6, thereby maintaining a stable housing state. In addition, a trunk 13, which projects up from base plate 9 of fastener 8 and has engaging claws 7 formed at the projecting end thereof, and a ridge 14, which is formed extending on base plate 9 and continuing from the base end of trunk 13 that projects from base plate 9, are inserted via opening 3 into an insertion groove 15 which is cut into fastener mounting seat 5. As a result, fastener 8 is clipped stably at a specific direction in fastener holder 6. Note that molding main body 1, fastener holder 6 and fastener 8 are typically formed of a synthetic resin.

In recent years there has been growing interest in recycling automobile parts, prompting investigation into the possibility of recycling automobile molding as well. However, recycling of automobile molding has been complicated by the fact that the typical design is one in which the fastener cannot be easily separated from the molding main body.

For example, fastener 8 cannot be easily removed from fastener holder 6 when attempting to separate fastener 8 from the molding main body 1 in the automobile molding shown in FIGS. 12 and 13, so that it becomes necessary to cut fastener holder 6 or fastener 8. As a result, recycling of the molding is not possible. Moreover, removal of fastener holder 6 and fastener 8 using a blade is dangerous and is not efficient due to the time required for this operation. In order to remove fastener 8 from fastener holder 6 with good efficiency, it is necessary to cut holding claws 11 on fastener 8 which are engaged in stopping members 12 on the fastener holder 6 side. However, in the case of a molding main body 1 in which, for example, a plurality of fastener holders 6 are provided, it becomes necessary to cut two holding claws 11 per anchored fastener 8 for every fastener holder 6. Thus, the number of cutting sites becomes numerous and efficiency is poor. Moreover, when nippers or other such tools are used to cut fasteners 8 (i.e., cut holding claws 11), the cut pieces can fly and become scattered about the work area, so that time is required for cleaning.

SUMMARY OF THE INVENTION

The present invention was conceived in consideration of the above-described circumstances and has as its objective the provision of an automobile molding and a fastener therefore, which enables a confident engagement to be maintained between the molding and the fastener when they are assembled together, and in which the fastener can be easily separated from the molding main body without causing damage to the parts due to cutting, etc., so that, following separation, both parts can be recycled.

In order to achieve the above-stated objectives, the invention according to the first aspect is an automobile molding equipped with:

a molding main body which has a design face, which will face the outside, and a reverse face, which will face the car body side, when the molding is attached to the car body;

a fastener holder which is formed to the reverse face of the molding main body; and a fastener which is held in place by the fastener holder to fastener the molding main body to the car body; wherein, the fastener holder is provided with at least two lateral walls projecting up from the reverse face of the molding main body to form sides of the fastener holder, excluding an opening maintained on one side of the fastener holder, and a fastener mounting seat that connects the lateral walls, defining a housing space which will permit the base plate of the fastener to be inserted;

the fastener is provided with a base plate, an engaging portion which projects upright from the base plate and engages in a mounting hole in the car body, and a pair of extending elastic pieces whose ends are free;

an insertion groove is formed in the fastener mounting seat of the fastener holder, the base end of the engaging portion which projects out from the base plate being inserted into this insertion groove and this insertion groove being formed to communicate with the aforementioned opening of the fastener holder; and engage-and-stop portions are formed in the lateral walls that are adjacent to the opening, wherein the protruding portions that project out from the elastic pieces can engage in a releasable manner from inside the housing space.

The invention according to the second aspect is characterized in that, in the automobile molding according to the first aspect, the engage-and-stop portions are formed by means of engaging holes that are formed passing through the lateral walls of the fastener holder that are adjacent to the opening of the fastener holder.

The invention according to the third aspect is characterized in that, in the automobile molding according to the second aspect, the engaging holes are cut into the fastener mounting seat from the lateral walls of the fastener holder that are adjacent to the opening of the fastener holder.

The invention according to the fourth aspect is characterized in that, in the automobile molding according to the first, second, or third aspects, protrusions for coming into contact with the fastener mounting seat on the housing space side are provided on opposite sides of the base plate at positions such that they will each come into contact with the fastener mounting seat on either side of the insertion groove.

The invention according to the fifth aspect is characterized in that, in the automobile molding according to the fourth aspect, the protrusions that are provided on opposite sides of the base plate are formed as ridges that extend along the direction of insertion of the base plate into the housing space.

The invention according to the sixth aspect is characterized in that, in the automobile molding according to the first to fifth aspects, protrusions that come in contact with the base plate of the fastener are provided projecting out from both sides of the insertion groove in the fastener mounting seat.

The invention according to the seventh aspect is characterized in that, in the automobile molding according to the first to sixth aspects, extending portions are formed at the free ends of the elastic pieces which extend out beyond the opening of the fastener holder when the fastener is inserted into the fastener holder.

The invention according to the eighth aspect is characterized in that, in the automobile molding according to the first to seventh aspects, engaging workpieces are formed to the free ends of the elastic pieces for engaging with a releasing tool, the releasing tool performing an operation to release the engagement between the protruding portions of the elastic pieces and the engage-and-stop portions of the fastener holder by elastically deforming the elastic pieces by bringing them into contact with one another.

The invention according to the ninth aspect is characterized in that, in the automobile molding according to the first to eighth aspects, when the base plate is inserted into and housed in the housing space, the elastic pieces on opposite sides of the base plate are biased from inside the housing space toward both of the lateral walls that are adjacent to the opening of the fastener holder due to their intrinsic elasticity.

The invention according to the tenth aspect is characterized in that, in the automobile molding according to the first to ninth aspects, the engaging portion is provided with a trunk, which is provided upright on the base plate; engaging claws, which are formed to the end of the trunk which projects from the base plate and engage in a mounting hole in the car body; and a cover which projects out so as to project out over the area around the trunk in the area between the engaging claws and the end of the trunk that projects upright from the base plate, the cover being pressed against the car body and covering the mounting hole when the engaging portion is engaged in the mounting hole in the car body, wherein:

the fastener is designed so that the fastener mounting seat is held between the base plate and the base end of the cover that projects out from the trunk, when the base plate is inserted into the housing space of the fastener holder.

The invention according to the eleventh aspect is characterized in that, in the automobile molding according to the tenth aspects, protrusions are provided to the base end of the cover that projects out from the trunk, for coming into contact with the fastener mounting seat.

The invention according to the twelfth aspect is characterized in that, in the automobile molding according to the tenth and eleventh aspects, protrusions are provided on both sides of the insertion groove of the fastener mounting seat, for coming into contact with the base end of the cover which projects out from the trunk.

The invention according to the thirteenth aspect is characterized in that, in the automobile molding according to the tenth to twelfth aspects, the base plate of the fastener is designed so as to be housed in the housing space in a state such that there is clearance between it and the reverse face of the molding main body.

The invention according to the fourteenth aspect is a fastener for fastening the molding main body to a car body which is held in place by a fastener holder that projects out from the reverse face of a molding main body, that has a design face that will face the outside and a reverse face that will face the inside of the car when the fastener holder is attached to the car body, the fastener being provided with:

a base plate that is inserted into the housing space inside the fastener holder via an opening that is formed to one side of the fastener holder;

an engaging portion that projects upright from the base plate and engages in a mounting hole in the car body; and a pair of extending elastic pieces whose ends are free; wherein:

protruding portions are formed to the elastic pieces for engaging in a releasable manner on the inside of the housing space with the engage-and-stop portions that are formed in the lateral walls that are adjacent to the opening of the fastener holder.

The invention according to the fifteenth aspect is characterized in that, in the fastener according to the fourteenth aspect, the fastener holder is provided with at least two lateral walls projecting up from the reverse face of the molding main body to form three sides of the fastener holder, excluding an opening maintained on one side of the fastener holder; and a fastener mounting seat, that connects the lateral walls, defining a housing space; wherein an insertion groove is formed in the fastener mounting seat that is continuous with the opening of the fastener holder, the end of the engaging portion that projects out from the base plate being inserted into this insertion groove; and protrusions, which come in contact with the fastener mounting seat on the housing space side, are provided on opposite sides of the base plate at positions on the base plate so that they each come in contact with the fastener mounting seat on either side of the insertion groove.

The invention according to the sixteenth aspect is characterized in that, in the fastener according to the fourteenth and fifteenth aspects, the extending portions that project beyond the opening of the fastener holder when the fastener is inserted into the fastener holder are formed at the free ends of the elastic pieces.

The invention according to the seventeenth aspect is characterized in that, in the fastener according to the fourteenth to sixteenth aspects, the engaging portion is provided with:

a trunk which is provided upright on the base plate;

engaging claws which are formed to the end of the trunk which projects from the base plate and engages in a mounting hole in the car body; and a cover which projects out over the area around the trunk in between the engaging claws and the end of the trunk that projects out from the base plate, and which is pressed against the car body and covers the engaging hole when the engaging portion is engaged in the engaging hole of the car body; and the fastener is designed so that the fastener mounting seat is held in between the base plate and the base end of the cover that projects out from the trunk, when the base plate is inserted into the housing space of the fastener holder.

In the present invention, protruding portions that are provided projecting out from the pair of elastic pieces provided on opposite sides of the base plate of the fastener engage from inside the housing space with engage-and-stop portions that are formed to the lateral walls of the fastener holder that are adjacent to the opening of the fastener holder. As a result, the fastener is fixed in place by the fastener holder. If the engagement between the protruding portions of the elastic pieces and the engage-and-stop portions of the fastener holder is released by manipulating the elastic pieces, the fastener can be removed from the fastener holder, and the fastener separated from the molding main body. As a result, the molding main body and the fastener can be separated without being damaged by cutting, etc. Therefore, for example, the fastener can be reused or recycled following separation.

The "engage-and-stop portion" referred to here is, for example, an engaging hole 37 formed passing through lateral walls 27 which are adjacent to the opening 26, as shown in FIG. 6(b), or an engaging concavity 37a which is cut into the housing space 29 side of lateral walls 27 which are adjacent to opening 26, as shown in FIG. 6(c). By engaging the protruding portions provided on the elastic pieces, it is possible to prevent the base plate from being pulled out of the housing space, and to enable stable housing of the base plate in the housing space.

In order to enable separation of the molding main body and the fastener by extracting the fastener which is fixed in place to the molding main body, it is not only necessary to be able to release the engagement between the protruding portions of the elastic pieces and the fastener holder's engage-and-stop portions, but also to smoothly carry out the operation of extracting the fastener from the fastener holder once the engagement is released. On this note, it is effective to reduce the contact resistance with the fastener mounting seat by forming the contact sites between the fastener and the fastener holder's fastener mounting seat so that they are in the form of protrusions extending from the base plate, or protrusions extending from the base end of the cover that is formed to the engaging portion of the fastener, for example, and, further, by forming the protrusions of the base plate and the base end of the cover to be in a form of a ridge that extends along the direction of insertion of the fastener into the fastener holder (more specifically, in the direction of insertion of the base plate into the housing space). By providing a design that ensures clearance between the molding main body and the base plate that is housed in the fastener holder's housing space, it is possible to confidently reduce the base plate's contact area with the molding main body and the fastener holder. As a result, the operation to remove the fastener from the fastener holder can be carried out smoothly.

It is also possible to use a fastener which has been separated from a molding main body in a fastener holder of a different design than that to which it had previously been affixed. By designing the fastener holder so that it can enable insertion and anchoring of a fastener in various types of molding main bodies, a single fastener can be utilized with molding main bodies of various types and designs. As a result, costs can be reduced.

In the present invention, the engagement between the protruding portions on the elastic pieces and the fastener holder's engage-and-stop portions is released by manipulating the elastic pieces of the fastener which has been fixed in place by the insertion of the base plate into the housing space of the fastener holder. As a result, it becomes possible to withdraw the fastener from the fastener holder and to separate the molding main body and the fastener without causing any damage from cutting or the like. Thus, for example, the separated molding main body and fastener can be reused or recycled, resulting in less waste and lower costs from reutilizing parts.

BRIEF DESCRIPTION OF THE DRAWINGS

FIG. 6(a) is a cross-sectional view along the line A—A indicated by the arrows in FIG. 2; FIG. 6(b) is a cross-sectional view along the line B—B indicated by the arrows in FIG. 2; and FIG. 6(c) is a cross-sectional view showing an example of the form of an engage-and-stop portion that consists of an engagement concavity.

FIG. 11 is a view showing a design in which protrusions are provided that come in contact with the base plate and/or the projecting base end of the cover on the fastener mounting seat side.

PREFERRED EMBODIMENTS OF THE PRESENT INVENTION

A first embodiment of the present invention will now be explained with reference to the accompanying figures.

Figure 1:
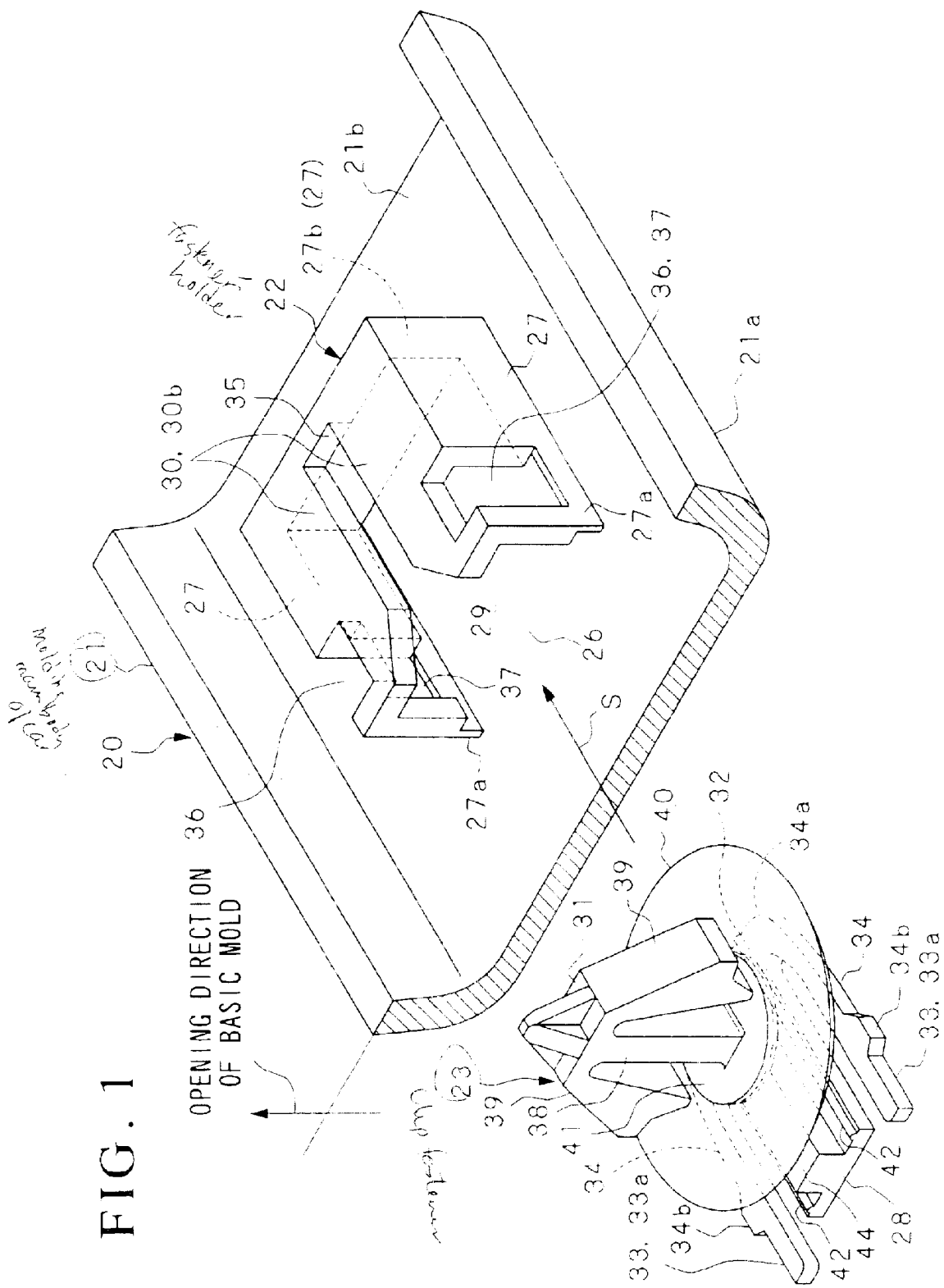
FIG. 1 is an exploded perspective view showing a fastener holder that is provided to the molding main body of a car molding, and a fastener that is inserted and fastened into this fastener holder, in an embodiment according to the present invention.
Figure 2:
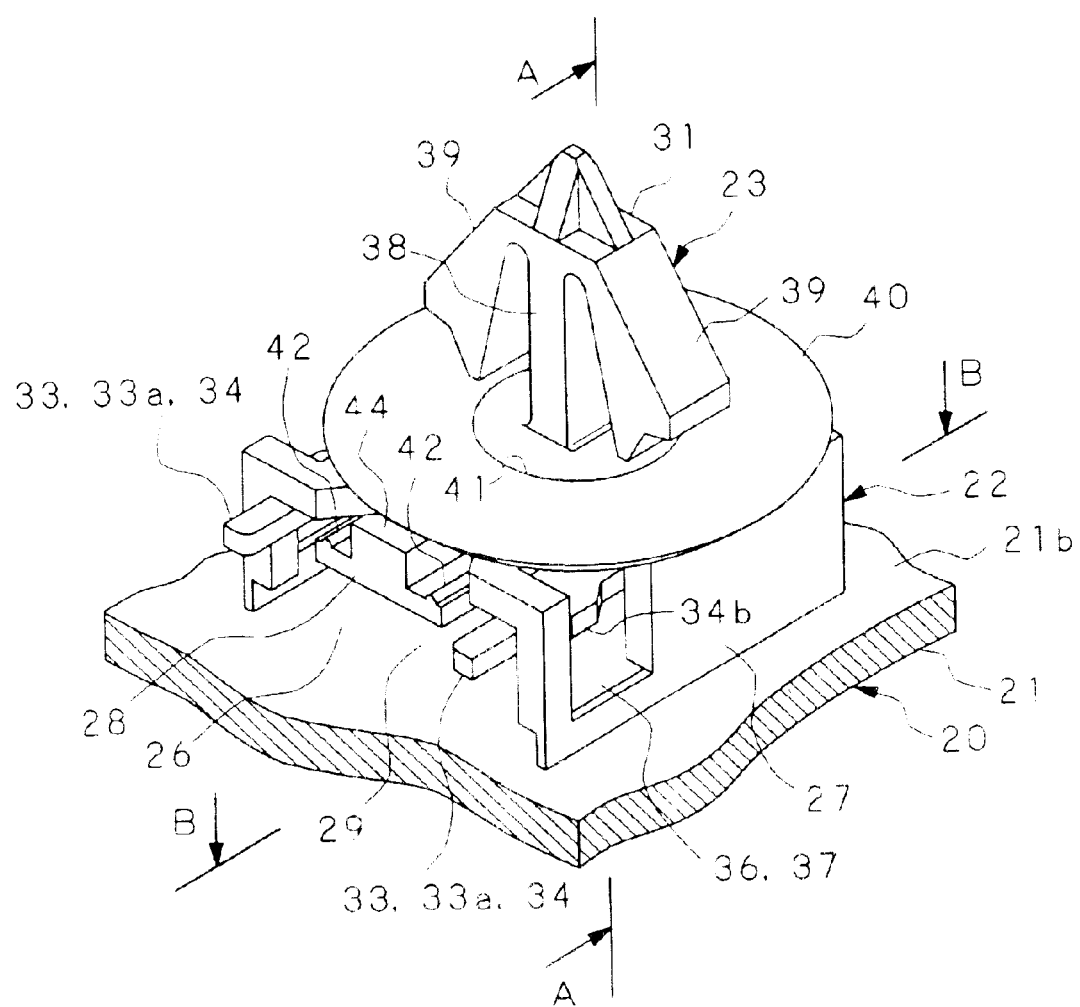
FIG. 2 is a perspective view showing the arrangement in which the fastener is inserted and clipped into the fastener holder in FIG. 1.
Figure 3:
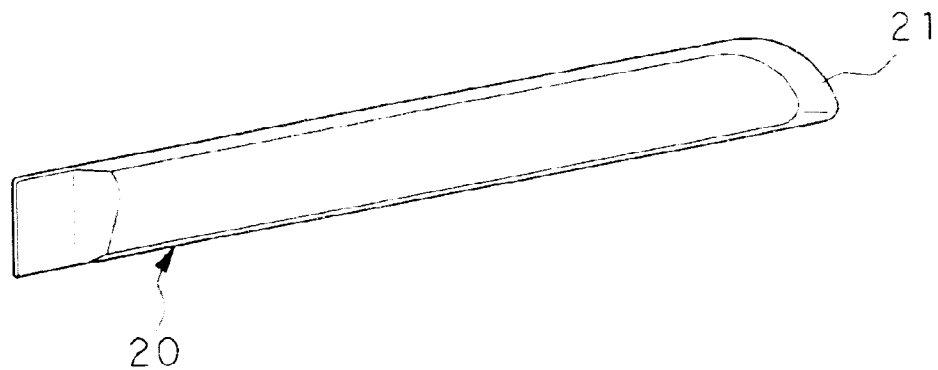
FIG. 3 is an overall perspective view of the car molding in the embodiment as seen from the design face that forms the outer surface of the molding main body.
Figure 4:
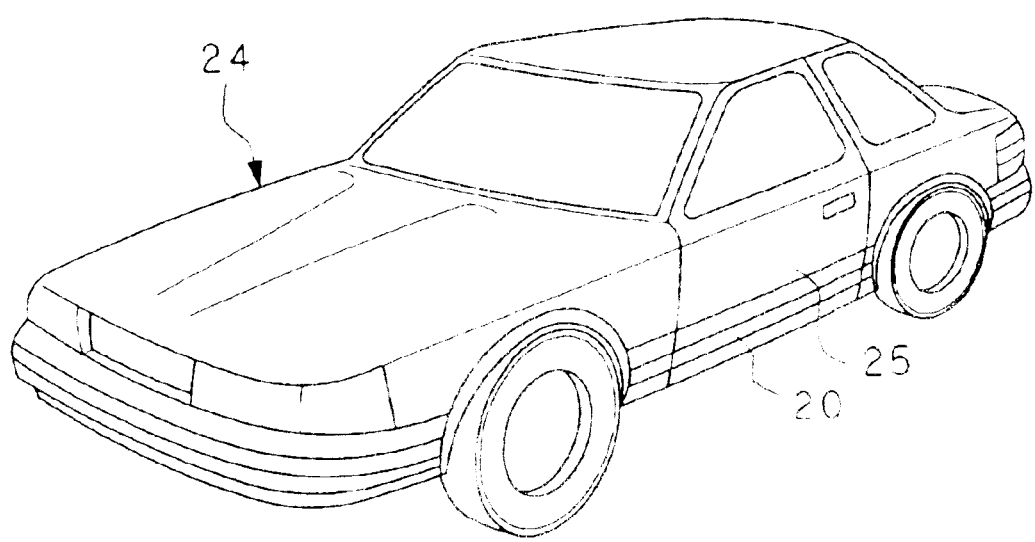
FIG. 4 is a perspective view showing an example of the mounting of the car molding in this embodiment.
Figure 5:
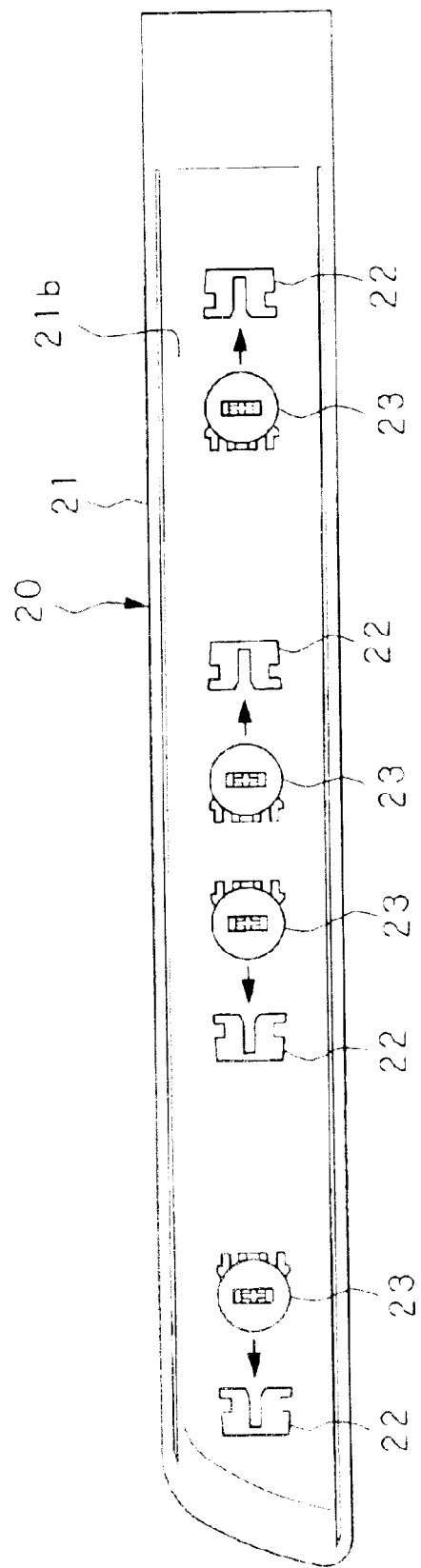
FIG. 5 is a view showing the reverse face of the molding main body of the car molding which is opposite the design face in this embodiment.

FIG. 1 is an exploded perspective view showing a fastener holder (clip holder, fastening portion holder) 22, which is provided to the molding main body 21 of a car molding 20, and a fastener (clip, fastening portion) 23, which is inserted and fastened into fastener holder 22, in the present invention. FIG. 2 is a perspective view showing an arrangement in which fastener 23 has been inserted and clipped into the fastener holder 22 shown in FIG. 1. FIG. 3 is a full perspective view looking at car molding 20 from the design face 21a side which forms the outer surface of molding main body 21. FIG. 4 is a perspective view showing an example of the mounting of car molding 20. FIG. 5 is a view showing the reverse face 21b, which is opposite design face 21a, of molding main body 21 of car molding 20.

As shown in FIGS. 1 through 5, car molding 20 is provided with a elongate thin molding main body 21, having a reverse face 21b which faces the car body 25 side, and a design face 21a, which comprises the outer surface when the molding is mounted to the car body 25 (e.g., the door in FIG. 4) of car 24; a fastener holder 22, which is formed to reverse face 21b of molding main body 21; and fastener 23 which is fastened into fastener holder 22 and fastens molding main body 21 to car body 25. Note that molding main body 21 and fastener holder 22 are made of polypropylene, while fastener 23 is made of polyacetal or the like.

Fastener holder 22 projects out from reverse face 21b of molding main body 21, and is provided with lateral walls 27 forming three sides thereof, excluding an opening 26 that is provided on one side of fastener holder 22; and a fastener mounting seat 30 that connects the lateral walls 27 and that is located at the opposite side of the molding main body 21 via a housing space 29 which will permit the base plate 28 of fastener 23 to be inserted (that is, at a position that provides a housing space 29 which will permit the base plate 28 of fastener 23 to be inserted onto the molding main body 21). Here, in FIG. 5, the direction of opening 26 of fastener holder 22 in the elongate molding main body 21 comprises one end surface extending along the length direction of molding main body 21 of fastener holder 22.

Fastener 23 is provided with a base plate 28; an engaging portion 31 which is provided projecting upright from base plate 28 and which engages in a mounting hole in the car body; and a pair of elastic pieces 34 that projectout from the insertion leading end 32 of the base plate 28 toward backwardly, and which project toward the origin of the line of action in the direction of insertion (symbol S in FIG. 1), the projecting ends of paired elastic pieces 34 forming free ends 33.

An insertion groove 35 is formed in fastener mounting seat 30 of fastener holder 22 communicating with opening 26. The projecting end 31a of engaging portion 31 which projects from base plate 28 is inserted into insertion groove 35. In addition, in this embodiment, engage-and-stop portions 36 are formed to the cross-directed lateral walls 27 on molding main body 21 which are adjacent to opening 26. Protruding portions 34b, which project out at a point between free end 33 and the end portion 34a of an elastic piece 34 which extends from base plate 28, engage in a releasable manner on the inside of housing space 29 with these engage-and-stop portions 36. Specifically, engage-and-stop portions 36 are comprised of engaging holes 37 that are formed passing through the pair of lateral walls 27 that are positioned in the cross-direction of molding main body 21 of fastener holder 22. Engaging holes 37 are cut into fastener mounting seat 30 from the pair of lateral walls 27 that are positioned in the cross direction of molding main body 21 of fastener holder 22. This has the advantage that an engagement hole 37 can be formed without an additional slide core mold (see FIG. 1).

As shown in FIG. 6(a), engaging portion 31 of fastener 23 has a trunk 38 that is provided upright on base plate 28; engaging claws 39, which are formed at the projecting end of trunk 38 on base plate 28, and which engage in a mounting hole 25a in car body 25; and a cover 40 which projects out in the space between engaging claws 39 and the base end of trunk 38 which stands upright on base plate 28 so as to cover the area around trunk 38, cover 40 covering mounting hole 25a as a result of being pushed into car body 25 when engaging portion 31 is engaged in mounting hole 25a of car body 25. When engaging portion 31 is engaged in mounting hole 25a of car body 25 and mounting hole 25a is covered by cover 40, mounting hole 25a is blocked by cover 40, so that leakage of water into the car is prevented. Cover 40 is formed in the shape of an umbrella. By pressing cover 40 against the car body 25 in the area around mounting hole 25a, it is possible to ensure water resistance around mounting hole 25a.

Note that the projecting end 31a of engaging portion 31 of fastener 23 is formed by the end of trunk 38 which projects upright from base plate 28.

When base plate 28 is inserted into housing space 29 in fastener holder 22, fastener mounting seat 30 is held between base plate 28 and the base end 41 of cover 40 which projects from trunk 38, so that fastener 23 is held stably without rattling. Projecting base end 41 projects out in the form of a flange about the entire periphery of trunk 38, and, along with base plate 28, sandwiches fastener mounting seat 30, thereby stabilizing fastener 23.

Base plate 28 of fastener 23 is designed to be housed in housing space 29 with a clearance 45 between itself and reverse face 21b of molding main body 21. For this reason, even if sufficient molding accuracy is not obtained at reverse face 21b of molding main body 21, contact with base plate 28 does not cause fastener 23 to rattle or tilt. Moreover, base plate 28 can be inserted into and withdrawn from housing space 29 smoothly without concern about its scratch resistance from contact with the reverse face 21b of the molding main body 21. As a result, the cost of molding main body 21 can be reduced since precise molding of reverse face 21b of molding main body 21 is not required.

Molded base ends 27a which are formed projecting out from molding main body 21 in the three lateral walls 27 that form fastener holder 22 are made thinner than other parts of lateral walls 27 (the thickness t of molded base end 27a, for example, is ⅓ that of the other parts of lateral wall 27). This prevents the appearance in design face 21 a of so called sink mark which accompany curing of the molding resin for molding main body 21. In addition, this also avoids imparting a negative impact on the molding precision of lateral walls 27 or fastener mounting seat 30, and guarantees excellent molding precision for lateral walls 27 and fastener mounting seat 30. For this reason, rattling of fastener 23 is prevented due to base plate 28's stable housing state in housing space 29. Thus, smooth insertion and withdrawal of base plate 28 into and out of housing space 29 can be realized.

The lateral wall 27 (referred to as "27b" for convenience of explanation) that is positioned opposite opening 26 via housing space 29 functions as a communication and reinforcement between the two cross-directed lateral walls 27 on molding main body 21, and, as needed, as a stopper for establishing the boundaries of insertion for fastener 23 into fastener holder 22 (i.e., lateral wall 27b has a stopper function as a result of base plate 28 coming into contact with it. It also possible to use the length of insertion groove 35 to set the boundaries for inserting fastener 23). Lateral wall 27 does not absolutely have to be provided so that it stands upright on reverse face 21b of molding main body 21. For example, it is also acceptable for lateral wall 27b to project out from part of a cross-directed lateral wall 27 of molding main body 21.

This embodiment showed an example in which an opening 26 for inserting fastener 23 was formed at an end face of molding main body 21 extending in the longitudinal direction thereof. However, in the case where the molding is formed to be larger in cross direction, opening 26 can be formed to an end face that extends in the width direction of molding main body 21 in the fastener holder.

By providing protrusions that come in contact with fastener mounting seat 30, to one or both of base plate 28 and the base end 41 of cover 40 that projects out from trunk 38, it is possible to prevent rattling of fastener 23 and to realize even smoother insertion and withdrawal of base plate 28 into and from housing space 29.

The smooth insertion and withdrawal of base plate 28 can be achieved even in the presence of protrusions on the fastener mounting seat 30 side.

In FIG. 6(a), protrusions 42 which come in contact with fastener mounting seat 30 from the housing space 29 side on base plate 28 of fastener 23 are provided on opposite sides of base plate 28 at positions that come in contact with seat surface 30a (referred to as "lower seat surface 30a" hereinafter) on the housing space 29 side of fastener mounting seat 30 on either side of insertion groove 35. Further, projections 42 are designed in the shape of a ridge that extends along the direction of insertion of base plate 28 into housing space 29. As a result, stable housing of base plate 28 can be realized even if lower seat surface 30a is slightly irregular, and the housing and withdrawal of base plate 28 in and from housing space 29 can be carried out smoothly without scratching.

Figure 7:
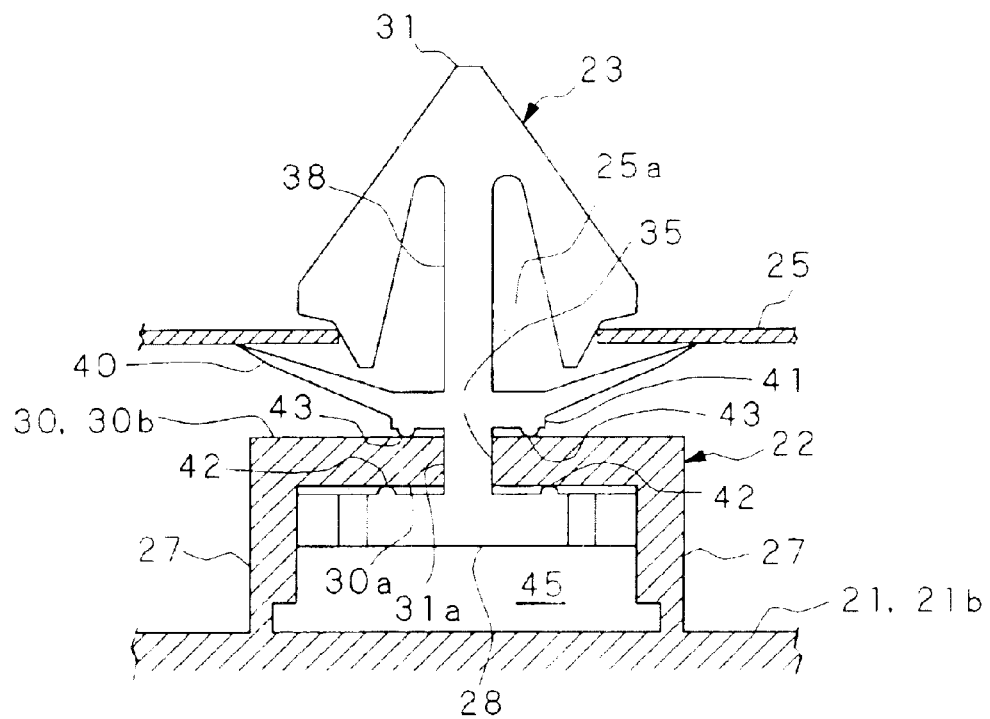
FIG. 7 is a cross-sectional view showing a design in which protrusions that come in contact with the fastener mounting seat of the fastener holder are provided to the base end of the cover that is formed projecting out from the engaging portion of the fastener, and to the base plate that is housed in the housing space inside the fastener holder.
Figure 8:
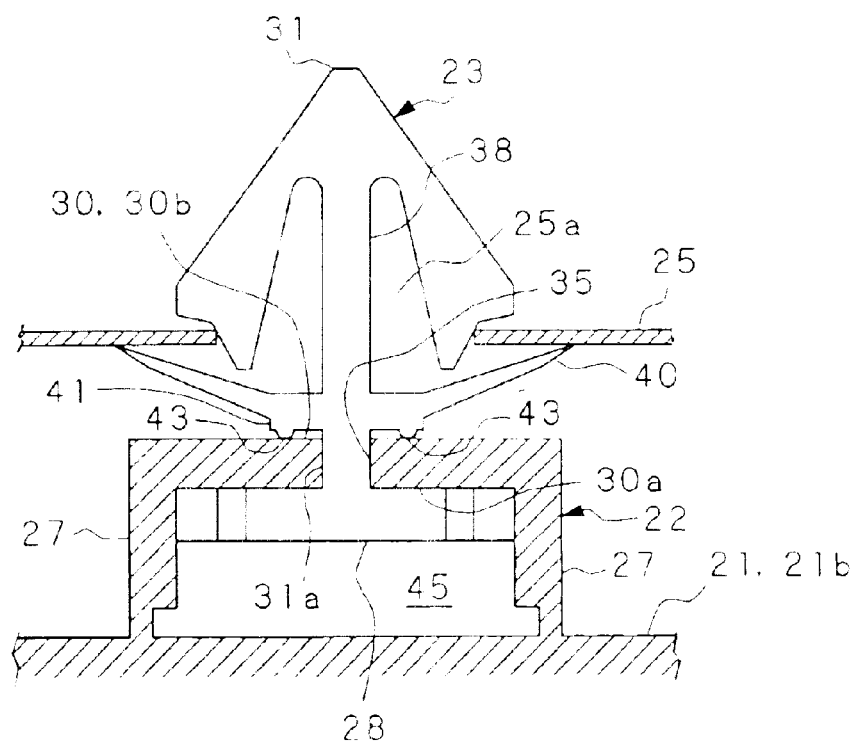
FIG. 8 is a cross-sectional view showing a design in which protrusions that come in contact with the fastener mounting seat of the fastener holder are provided to the base end of the cover that is formed projecting out from the engaging portions of the fastener, but are omitted from the base plate that is housed in the housing space inside the fastener holder.

FIG. 7 is an example in which, in addition to protrusions 42 on base plate 28, protrusions 43 have been provided to base end 41 of cover 40 that projects out from trunk 38, these protrusions 43 each coming into contact with the fastener mounting seat 30 (more specifically, the outer surface of fastener mounting seat 30, hereinafter referred to as "upper seat surface 30b") on either side of insertion groove 35. FIG. 8 is an example in which, protrusions 42 on base plate 28 have been omitted and only protrusions 43 on projecting base end 41 of cover 40 which come in contact with upper seat surface 30b on either side of insertion groove 35 have been provided. All of the protrusions 42,43 shown in FIGS. 6(a), 7 and 8 are formed in the shape of a ridge that extends in the direction of insertion of base plate 28 into housing space 29, thereby enabling the smooth insertion and withdrawal of base plate 28 into housing space 29. In addition, stable fixation of fastener 23 is benefited by making the interval of the space between paired protrusions 42,42 and 43,43 as large as possible.

Figure 11A:
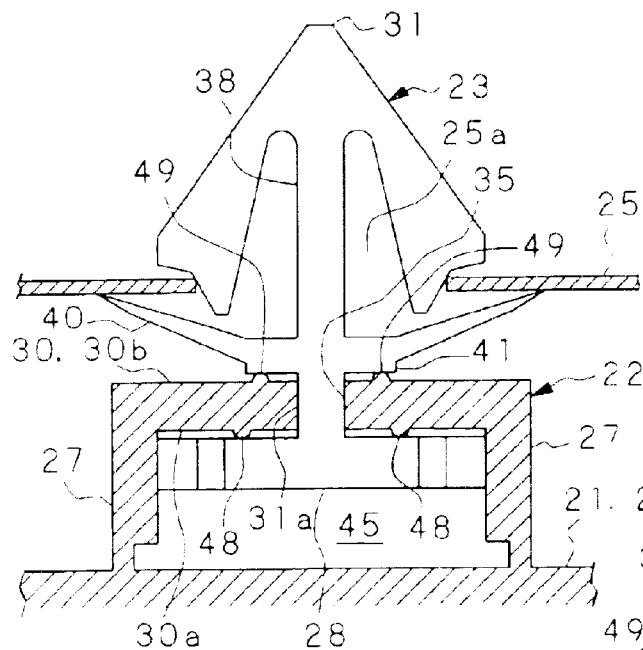
FIG. 11(a) shows an example in which protrusions that are in contact with the base plate and protrusions that are in contact with the projecting base end of the cover have been provided.
Figure 11B:
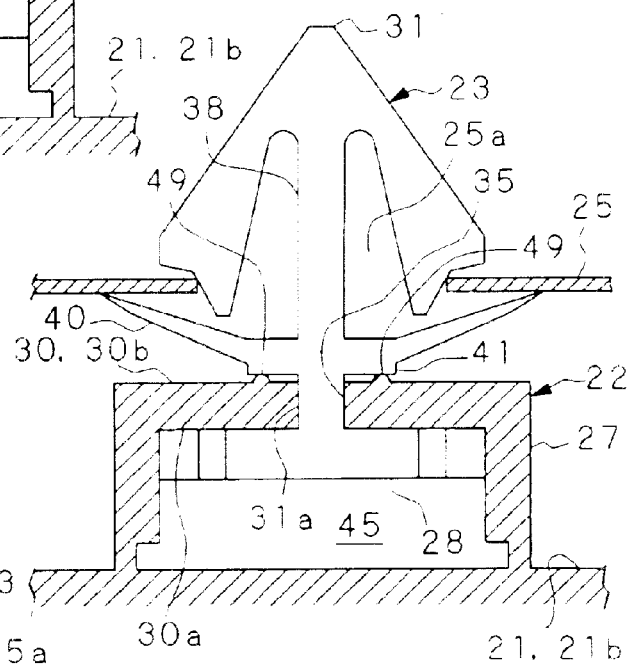
FIG. 11(b) shows an example in which protrusions that are in contact with the projecting base end of the cover have been provided.
Figure 11C:
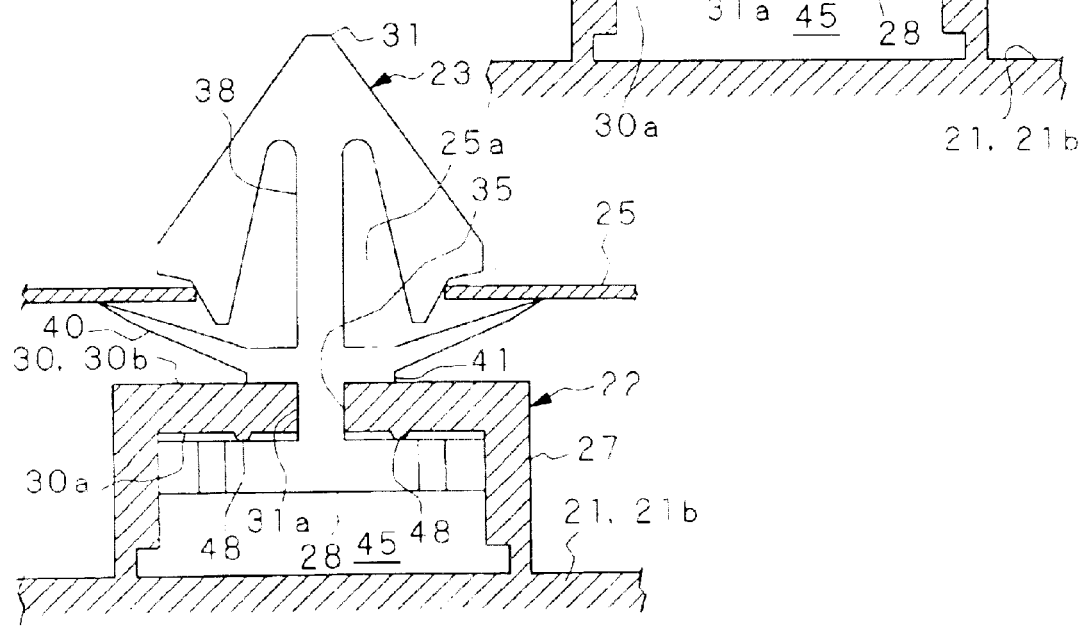
FIG. 11(c) shows an example in which protrusions that are in contact with the base plate have been provided.
Figure 12:
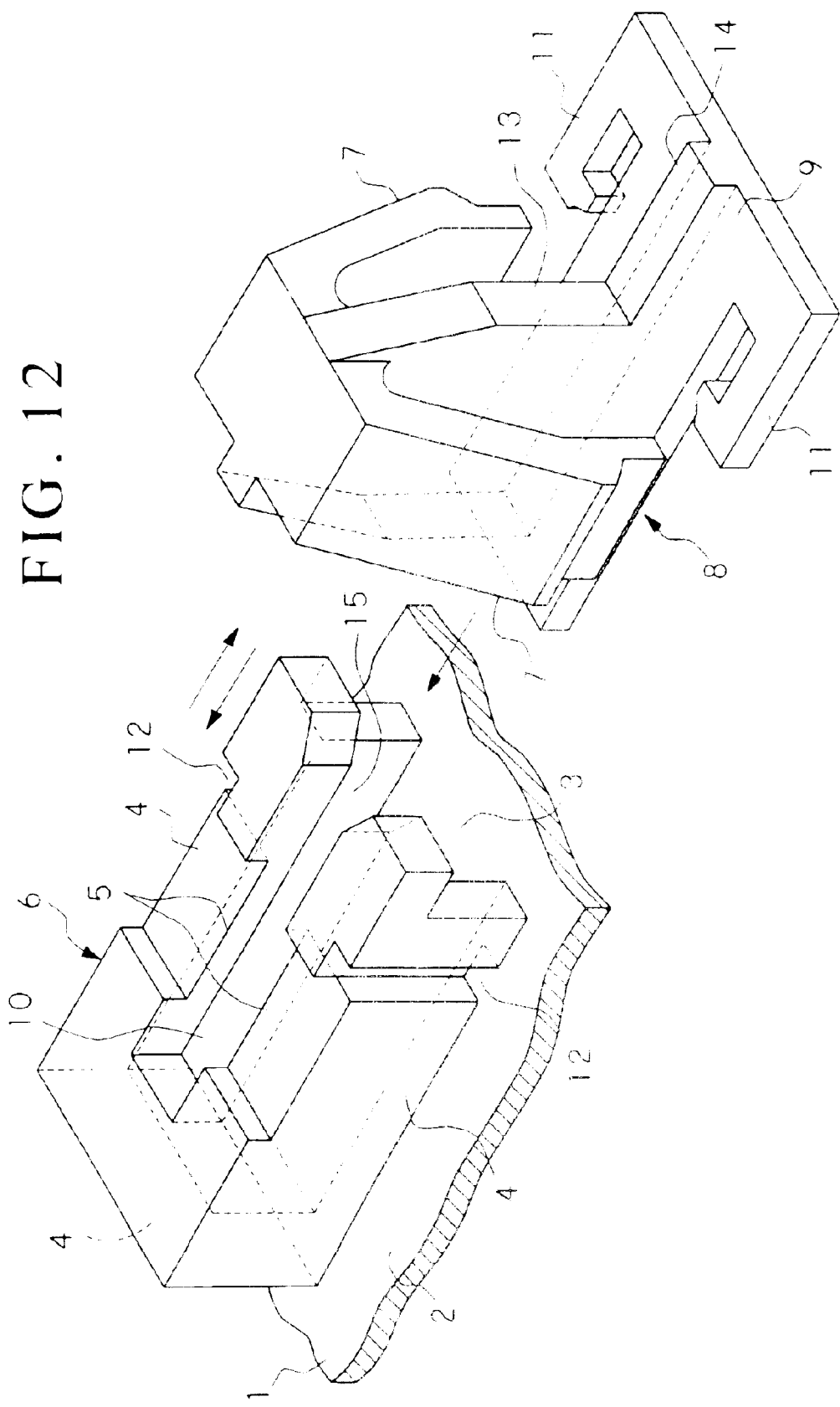
FIG. 12 is a view showing a car molding according to the conventional art, and is an exploded perspective view of the fastener holder and the fastener that is inserted into the fastener holder.
Figure 13:
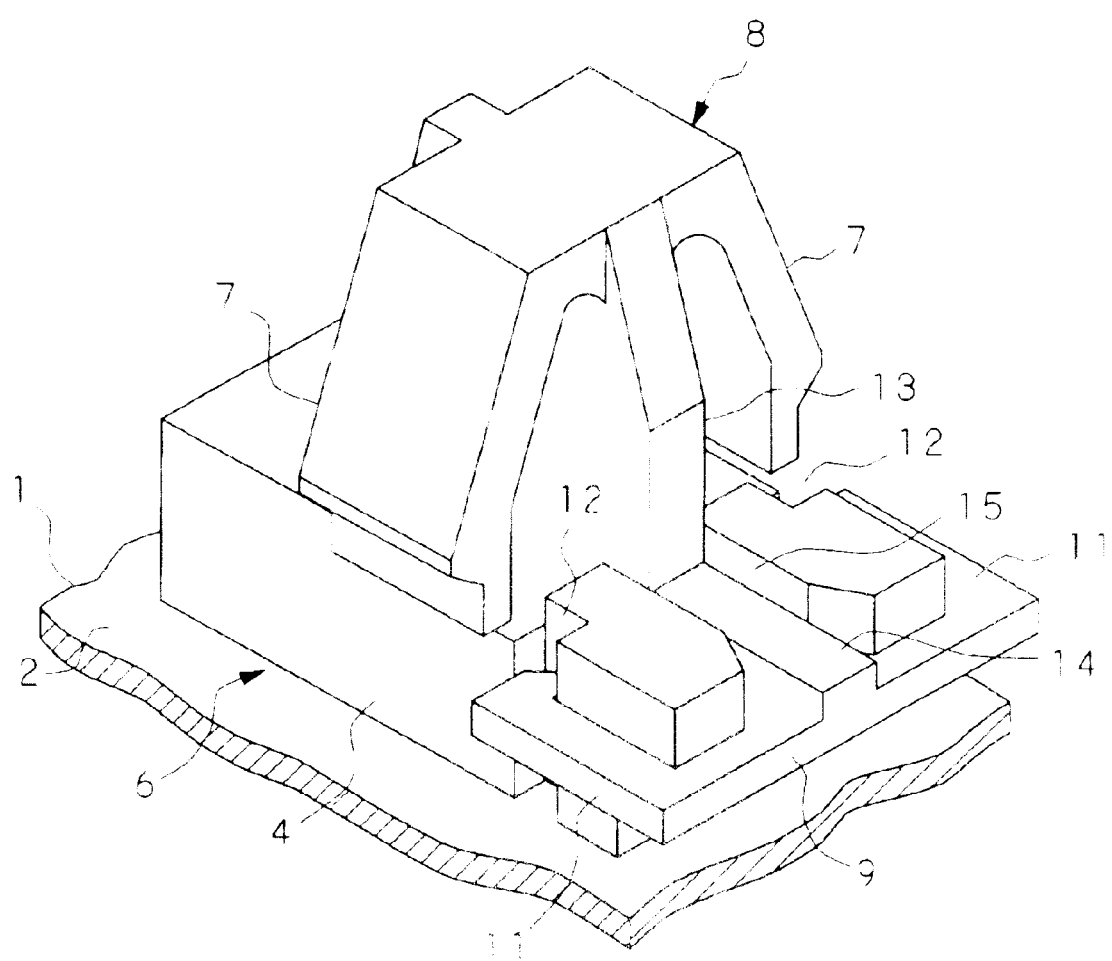
FIG. 13 is a perspective view showing an arrangement in which a fastener has been inserted into and held in place in the fastener holder of the automobile molding in FIG. 12.

FIG. 11(a) shows an example in which protrusions 48, which come in contact with base plate 28, and protrusions 49, which come in contact with the projecting base end 41 of cover 40, are provided to fastener mounting seat 30 at positions which are on either side of insertion groove 35. FIG. 11(b) is an example in which protrusions 48 which come in contact with base plate 28 have been omitted, and only protrusions 49 which come in contact with projecting base end 41 of cover 40 have been provided to fastener mounting seat 30 at positions on either side of insertion groove 35. FIG. 11(c) is an example in which protrusions 48, which come in contact with base plate 28 are provided to fastener mounting seat 30 at positions which are on either side of insertion groove 35, and protrusions 49, which come in contact with the projecting base end 41 of cover 40 have been omitted.

A key 44, which is provided on base plate 28 and is inserted into insertion groove 35 along with engaging portion 31 (more specifically, the end of trunk 38 that stands upright from base plate 28), fulfills the function of preventing the rotation of the base plate 28).

Figure 9:
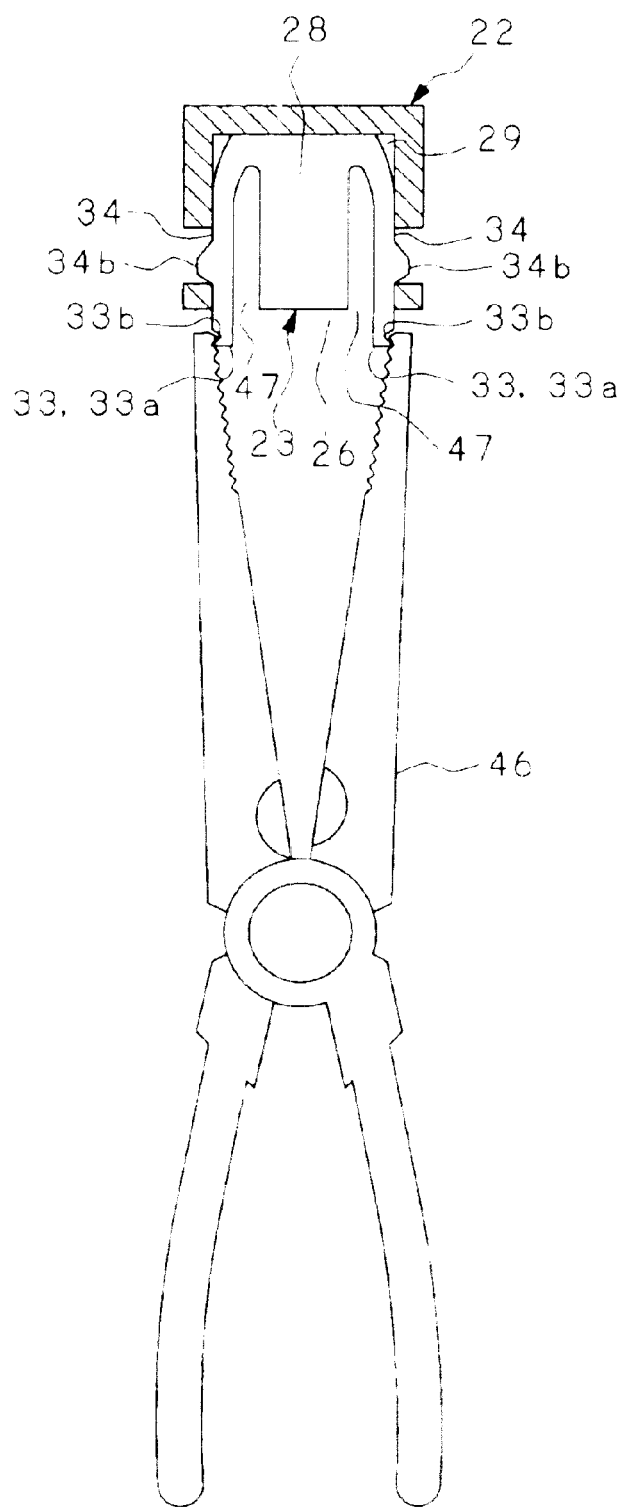
FIG. 9 is a planar view showing an arrangement in which a releasing tool is engaged with the free ends of the pair of elastic pieces of the fastener that is inserted into and held in place in the fastener holder.

As shown in FIGS. 6(b), 2, and 9, when base plate 28 is inserted into and housed in housing space 29, the elastic pieces 34 opposite one another on either side of base plate 28 are also housed in housing space 29. Due to their own elasticity, these elastic pieces 34 are biased from inside housing space 29 toward the two lateral walls 27 that are positioned in the cross-direction of molding main body 21 on fastener holder 22. As a result, the state of engagement between the protruding portions 34b of each elastic piece 34 and engage-and-stop portions 36 can be maintained stably. Furthermore, elastic pieces 34 hold base plate 28 at a specific position inside housing space 29 due to the biasing force that presses against the pair of lateral walls 27 in which engage-and-stop portions 36 are formed. The biasing force from the pair of elastic pieces 34 works to stably maintain base plate 28 inside housing space 29 in a state such that at least insertion leading end 32 of base plate 28 is inserted into housing space 29, and at least a portion of both elastic pieces 34 are housed in housing space 29. Therefore, for example, when initially inserting base plate 28 into housing space 29, this biasing force from the pair of elastic pieces functions to guide base plate 28 into the correct housing position inside housing space 29.

Engage-and-stop portions 36 are not limited to a design consisting of the engaging hole 37 shown in FIG. 6(b). Rather, as shown in FIG. 6(c), it is also acceptable to employ an engagement concavity 37a or the like which is cut into the inner face, i.e., the surface facing housing space 29, of the two lateral walls 27 that are adjacent to opening 26 of fastener holder 22. As in the case of an engage-and-stop portion 36 consisting of an engagement hole 37, an engage-and-stop portion 36 consisting of an engagement concavity 37a functions to stabilize the state of engagement between protruding portions 34b of each elastic piece 34 and engage-and-stop portions 36, and to guide base plate 28 to the correct housing position inside housing space 29.

Extending portions 33a are formed to the free ends 33 of the pair of elastic pieces 34 of fastener 23, these extending portions 33a projecting beyond opening 26 to the outside of fastener holder 22 when fastener 23 is inserted into fastener holder 22. In addition, engaging workpieces 33b are formed to extending portions 33a. Releasing tool 46 (see FIG. 9), which releases the engagement between protruding portions 34b of elastic pieces 34 and engagement hole 37, engages with these engaging workpieces 33b.

Using the space interval 47 maintained between elastic pieces 34 and base plate 28 to elastically deform extending portions 33 of elastic pieces 34 so that extending portions 33 are brought closer to one another, it is possible to release the engagement between protruding portions 34b of elastic pieces 34 and engagement hole 37. As a result, base plate 28 can be withdrawn from housing space 29 and fastener 23 can be separated from fastener holder 22. By manipulating extending portions 33 to deform elastic pieces 34, the release of the engagement between protruding portions 34b and engagement hole 37 is not restricted to the use of a releasing tool 46. Rather, for example, this operation can be carried out by hand. However, if the engagement release operation is carried out using a releasing tool 46, then extending portions 33 can be made shorter. Further, even if elastic pieces 34 are of a length which does not project beyond opening 26 to the outside of fastener holder 22, an operation to release the engagement is possible by inserting a releasing tool 46 into housing space 29. Thus, it becomes possible to reduce the size of fastener 23 and fastener holder 22.

Figure 10:
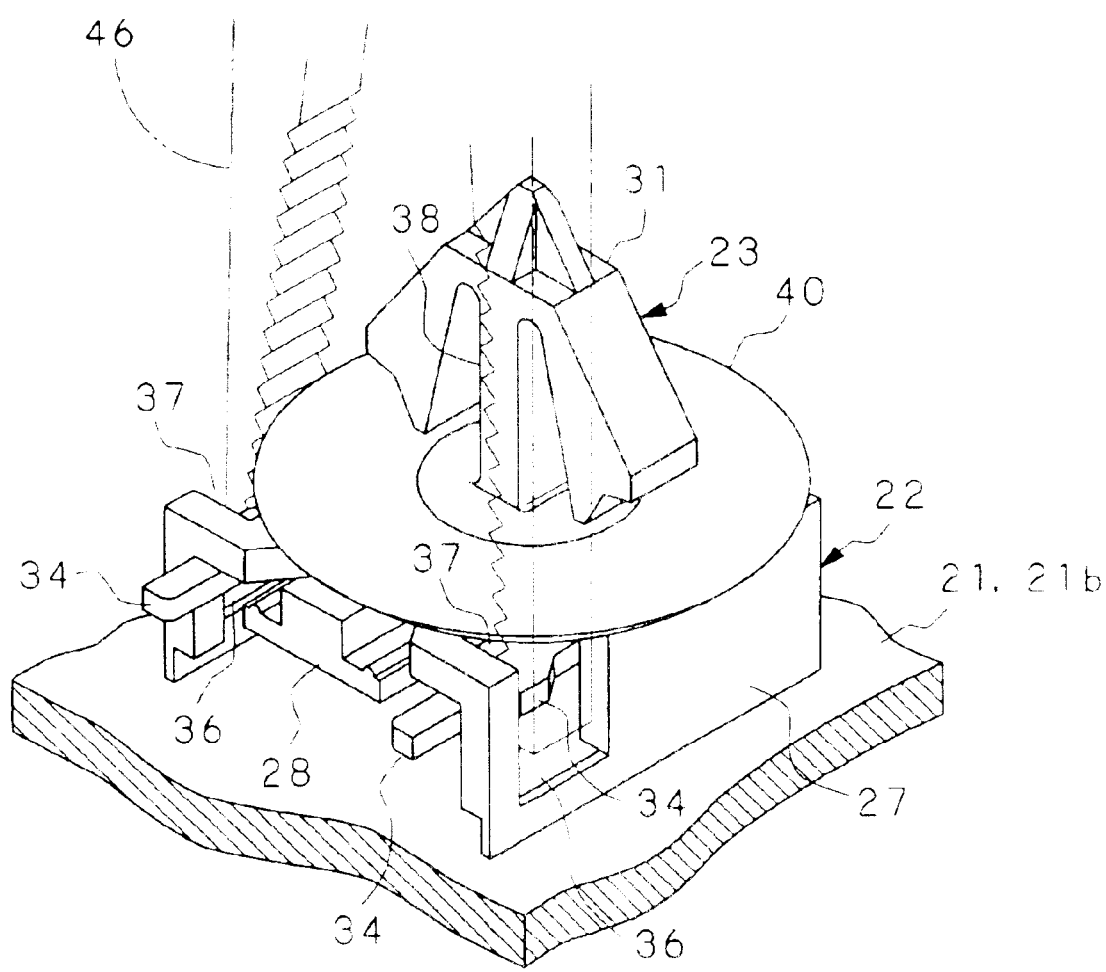
FIG. 10 is a perspective view showing the projection of the pair of elastic pieces on a fastener that has been inserted into and held in place in the fastener holder.

The operation to elastically deform elastic pieces 34 so that they are brought closer to one another is not limited to manipulation of extending portions 33 as shown in FIG. 9. For example, as shown in FIG. 10, engagement holes 37 which are cut in opposite sides of fastener mounting seat 30 may be employed to push protruding portions 34b of elastic pieces 34 into housing space 29, thereby enabling release of the engagement with engage-and-stop portions 36 (engagement holes 37). When fastener 23 is withdrawn in the engagement release state, fastener 23 can be separated from molding main body 21.

In this case, use of a releasing tool 46 is desirable from the perspective of ensuring workability, since the operation is performed using narrow engagement holes 37.

In this automobile molding 20, the engagement between protruding portions 34b and engaging holes 37 is released due to the elastic deformability of elastic pieces 34. Thus, fastener 23 can be separated from molding main body 21 without damaging the parts by cutting, etc. Accordingly, a molding main body 21 and fastener 23 which have been separated from one another can be recycled. In particular, provided there is no problem with respect to strength, etc., a fastener 23 can be reused irrespective of whether it is dirty, etc., so that even more efficient recycling can be accomplished. Moreover, provided that it is a molding main body which has a fastener holder into which fastener 23 can be inserted and fixed in place, then fastener 23 can be employed in molding main bodies that have fastener holders that are designed with a shape different than that of fastener holder 22 discussed above. Thus, fastener 23 has excellent general purpose applicability. Moreover, this quality of fastener 23 is not limited solely to when it is recycled. Rather, it goes without saying that fastener 23 can be applied to a variety of molding main bodies at the time of its initial use.

The automobile molding 20 shown in FIG. 5 is a design in which fastener holders 22 are provided to a variety of sites (four sites in FIG. 5) along the longitudinal direction of the molding. In both the fastener holders 22 that are formed at one end of molding 20 in the center of the molding along its longitudinal direction, and the fastener holders 22 that are formed at the other end of molding 20 in the center of the molding along its longitudinal direction, the openings 26 in all of these fastener holders 22 are formed facing the center in the longitudinally direction of automobile molding 20. Thus, if this same automobile molding 20 is provided with a design in which the openings 26 for the plurality of fastener holders 22 do not all face the same direction, but rather some of openings 26 are directed in the opposite direction, then it very difficult for unintentional release from car body 25 to occur due to external forces directed along the longitudinal direction of automobile molding 20. In addition, fastener holders 22 which are positioned at either end along the longitudinal direction of automobile molding 20 maintain the operational space on either side of the central area along the longitudinal direction of molding main body 21 for inserting or withdrawing fastener 23. For this reason, fasteners 23 can be positioned as close as possible to the longitudinal ends of molding main body 21.

Note that the present invention is not limited to the embodiments described above, but rather, a variety of variations thereon are of course possible.

For example, the specific shape of the fastener holder or the fastener may be changed as convenient for design purposes, with a variety of structures being applicable.

In addition, this automobile molding is not only applicable to the external surface of automobiles; it may also be used inside the car or as interior decoration.

What is claimed:

1. An automobile molding provided with a molding main body which has a design face, which will face the outside, and a reverse face, which will face the car body side, when the molding is attached to a car body; a fastener holder which is formed to said reverse face of said molding main body; and a fastener which is held in place by said fastener holder to fasten said molding main body to the car body; wherein:

said fastener holder is provided with at least two lateral walls projecting up from said reverse face of said molding main body to form sides of said fastener holder, excluding an opening maintained on one side of said fastener holder, a fastener mounting seat that connects the lateral walls, defining a housing space which will permit a base plate of said fastener to be inserted, and engage-and-stop portions formed in said lateral walls that are adjacent said opening;

said fastener is provided with an engaging portion which projects upright from said base plate and is configured to engage in a mounting hole in the car body, and a pair of extending elastic pieces having protruding portions, wherein said elastic pieces extend from the base plate and engage with said fastener holder to secure said fastener thereto, the projecting ends of said elastic pieces being free; and an insertion groove is formed in said fastener mounting seat of said fastener holder, the end of said engaging portion which projects out from said base plate being inserted into this insertion groove and this insertion groove being formed to communicate with the aforementioned opening of said fastener holder;

wherein the protruding portions that project out from said elastic pieces can engage with said engage-and-stop portions of said fastener in a releasable manner from inside said housing space.

2. An automobile molding according to claim 1, characterized in that said engage-and-stop portions are formed by means of engaging holes that are formed passing through the lateral walls of said fastener holder that are adjacent to said opening of said fastener holder.

3. An automobile molding according to claim 2, wherein said engaging holes are cut into said fastener mounting seat from the lateral walls of said fastener holder that are adjacent to said opening of said fastener holder.

4. An automobile molding according to claim 1, wherein protrusions for coming into contact with said fastener mounting seat on said housing space side are provided on opposite sides of said base plate at positions such that they will each come into contact with said fastener mounting seat on either side of said insertion groove.

5. An automobile molding according to claim 4, wherein said protrusions that are provided on opposite sides of said base plate are formed as ridges that extend along the direction of insertion of said base plate into said housing space.

6. An automobile molding according to claim 1, wherein protrusions for coming into contact with said base plate of said fastener are provided projecting out from either side of said insertion groove in said fastener mounting seat.

7. An automobile molding according to claim 1, wherein extending portions are formed to the free ends of said elastic pieces that extend from said opening to the outside of said fastener holder when said fastener is inserted into said fastener holder.

8. An automobile molding according to claim 1, wherein engaging workpieces are formed at the free ends of said elastic pieces for engaging with a releasing tool, which performs a releasing operation on the engagement of said protruding portions of said elastic pieces with said engage-and-stop portions by elastically deforming the elastic pieces so that the elastic pieces are brought closer to one another.

9. An automobile molding according to claim 1, wherein when said base plate is inserted into and housed in said housing space, said elastic pieces on opposite sides of said base plate are biased from inside said housing space toward both lateral walls adjacent to said opening of said fastener holder as a result of their own elasticity.

10. An automobile molding according to claim 1, wherein said engaging portion is provided with a trunk which is provided upright on said base plate; engaging claws which are formed to the end of the trunk which projects from said base plate and are configured to engage in a mounting hole in the car body; and a cover which projects out so as to extend over the area around said trunk in between said engaging claws and the end of said trunk that projects upright from said base plate, and which is pressed against the car body and covers said mounting hole when said engaging portion is engaged in said mounting hole of the car body, wherein:
said fastener is designed so that said fastener mounting seat is held between said base plate and said base end of said cover that projects out from said trunk, when said base plate is inserted into said housing space of said fastener holder.

11. An automobile molding according to claim 10, wherein protrusions are provided to the base end of said cover that projects out from said trunk, for coming into contact with said fastener mounting seat.

12. An automobile molding according to claim 10, wherein protrusions are provided on both sides of said insertion groove in said fastener mounting seat for coming into contact with the base end of said cover which projects out from said trunk.

13. An automobile molding according to claim 10, wherein the base plate of said fastener is designed so as to be housed in said housing space in a state such that there is clearance between it and the reverse face of said molding main body.

14. A fastener for fastening a molding main body to a car body which is held in place by a fastener holder that projects out from a reverse face of a molding main body that has a design face that will face the outside and a reverse face that will face the inside of a car when the fastener holder is attached to a car body, the fastener being provided with:
a base plate;
an engaging portion that projects upright from the base plate and is configured to engage in a mounting hole in the car body; and
a pair of extending elastic pieces provided on and extending from said base plate and having protruding portions thereon, projecting ends of the pair of said elastic pieces being free;
wherein said base plate and pair of said elastic pieces are capable of being inserted into a housing space inside said fastener holder via an opening that is formed at one end of said fastener holder; and
wherein said protruding portions are formed on said elastic pieces for being capable of engaging with engage-and-stop portions that are formed in lateral walls that are adjacent to said opening of said fastener holder in a releasable manner on the inside of said housing space; and
wherein parts of said elastic pieces are exposed from said fastener holder when said baseplate and said pair of said elastic pieces are inserted into said housing space so as to be operable from outside to cause said elastic pieces to deform and disengage from said engage-and-stop portions.

15. A fastener according to claim 14, wherein protrusions capable of coming in contact with said fastener holder from the inside are provided on opposite sides of said base plate at positions on the base plate so that each is capable of coming in contact with a fastener mounting seat on either side of an insertion groove provided on said fastener holder.

16. A fastener according to claim 14, wherein extending potions that project beyond said opening to the outside of said fastener holder when said fastener is inserted into said fastener holder are formed at the free ends of said elastic pieces.

17. A fastener according to claim 14, wherein said engaging portion is provided with a trunk which is provided upright on said base plate; engaging claws which are formed to the end of the trunk which projects from said base plate and is configured to engage in a mounting hole in the car body; and a cover which projects out so as to project over the area around said trunk in between said engaging claws and the end of said trunk that projects out from said base plate, and which is pressed against the car body and covers the mounting hole when the engaging portion is engaged in the mounting hole of the car body; and
said fastener is designed so that said fastener holder is held in between said base plate and the end of said cover that extends from said trunk, when said base plate is inserted into said fastener holder.

18. An automobile molding according to claim 2, wherein protrusions for coming into contact with said base plate of said fastener are provided projecting out from either side of said insertion groove in said fastener mounting seat.

19. An automobile molding according to claim 3, wherein protrusions for coming into contact with said base plate of said fastener are provided projecting out from either side of said insertion groove in said fastener mounting seat.

20. An automobile molding according to claim 4, wherein protrusions for coming into contact with said base plate of said fastener are provided projecting out from either side of said insertion groove in said fastener mounting seat.

21. An automobile molding according to claim 5, wherein protrusions for coming into contact with said base plate of said fastener are provided projecting out from either side of said insertion groove in said fastener mounting seat.

22. An automobile molding according to claim 1, wherein said elastic pieces project in the direction of said base plate's trailing edge of insertion into said housing space.

23. A fastener according to claim 14, wherein said elastic pieces extend in parallel to said lateral walls of said fastener holder.

24. A fastener for fastening a vehicle part to a car body which is held in place by a fastener holder that projects out from a reverse face of said vehicle part, the vehicle part having an outer surface that will face the outside and a reverse face that will face the car body when the fastener holder is attached to a car body, the fastener being provided with:
   a base plate;
   an engaging portion that projects upright from the base plate and is configured to engage in a mounting hole in the car body; and
   a pair of extending elastic pieces provided on and extending from said base plate and having protruding portions thereon, the pair of extending elastic pieces having free projecting ends;
   wherein the base plate and the pair of elastic pieces are capable of being inserted into a housing space inside the fastener holder via an opening that is formed at one end of the fastener holder; wherein the protruding portions on the elastic pieces are capable of engaging in a releasable manner with engage-and-stop portions that are formed in lateral walls adjacent to the opening of the fastener holder on the inside of the housing space;
   and wherein parts of the elastic pieces are exposed from the fastener holder when the base plate and the pair of the elastic peices are inserted into the housing space so as to be operable from outside to cause the elastic pieces to deform and disengage from the engage-and-stop portions.

25. A fastener according to claim 24, further comprising protrusions on opposite sides of the base plate, each protrusion capable of coming in contact with a fastener mounting seat on either side of an insertion groove provided on the inside of the fastener holder.

26. A fastener according to claim 24, further comprising extending portions formed at the free ends of the elastic pieces, wherein the extending portions are configured to project beyond the opening of the fastener holder to the outside when the fastener is inserted into the fastener holder.

27. A fastener according to claim 24, wherein the engaging portion further includes a trunk that projects from the base plate; engaging claws formed at the end of the trunk configured to engage in a mounting hole in the car body; and a cover extending from the trunk and disposed between the engaging claws and the base of the trunk such that when the fastener is pressed against the car body and the engaging portion is engaged in the mounting hole of the car body, the cover extends to cover the mounting hole; and
   wherein the fastener is configured so that when the base plate is inserted into the fastener holder, the fastener holder is held between the base plate and the end of the cover extending from the trunk.

28. A fastener according to claim 24, wherein the elastic pieces project in the direction of the base plate's trailing edge of insertion into the housing space.

* * * * *